United States Patent [19]

Walker, Jr.

[11] Patent Number: 4,584,702
[45] Date of Patent: Apr. 22, 1986

[54] NOISE CANCELLING TELEPHONE TRANSMITTER INSERTABLE IN TELEPHONE HANDSET RECEPTACLE

[75] Inventor: Wesley F. Walker, Jr., Ringgold, Ga.

[73] Assignee: Walker Equipment Corporation, Ringgold, Ga.

[21] Appl. No.: 562,930

[22] Filed: Dec. 19, 1983

[51] Int. Cl.[4] .................. H04R 19/01; H04M 1/03
[52] U.S. Cl. .................... 381/71; 179/111 E; 179/121 R; 381/91
[58] Field of Search ............ 381/71, 91, 122; 179/180, 121 R, 187, 111 R, 188, 111 E

[56] References Cited

U.S. PATENT DOCUMENTS

| | | |
|---|---|---|
| 664,904 | 1/1901 | Skold . |
| 1,372,862 | 3/1921 | Carmody . |
| 2,118,993 | 5/1938 | Volf . |
| 2,311,416 | 2/1943 | Salb et al. ............... 181/24 |
| 3,536,862 | 10/1970 | Weingartner ........... 179/121 |
| 3,660,602 | 5/1972 | Thompson ............. 179/110 A |
| 3,830,988 | 8/1974 | Mol et al. ............... 179/87 |
| 4,009,355 | 2/1977 | Poradowski ........... 179/179 |
| 4,424,419 | 1/1984 | Chaput et al. ......... 179/187 X |
| 4,449,236 | 5/1984 | Walker, Jr. ............. 179/111 E X |
| 4,463,222 | 7/1984 | Poradowski ........... 179/188 X |

FOREIGN PATENT DOCUMENTS 929623  1/1948  France .

Primary Examiner—James L. Dwyer
Attorney, Agent, or Firm—Seidel, Gonda, Goldhammer & Abbott

[57] ABSTRACT

A noise cancelling telephone transmitter comprising a cap and a cup coupled together so as to form an assembly insertable as a unit in the receptacle of a telephone handset. The cap is provided with an opening for passing sound. The inlet of the cap opening is covered by an acoustically deformable material such as a Mylar membrane. An electret microphone is mounted within the assembly such that the microphone acoustic entrance faces the outlet of the cap opening. A ring-shaped acoustic damping element is interposed between the cap underside and the plane of the microphone acoustic entrance. The cap is provided with a depending acoustic baffle which surrounds the damping element proximate the plane of the microphone acoustic entrance.

14 Claims, 8 Drawing Figures

NOISE CANCELLING TELEPHONE TRANSMITTER INSERTABLE IN TELEPHONE HANDSET RECEPTACLE

BACKGROUND OF THE INVENTION

The invention is directed to a noise cancelling telephone transmitter for use in a telephone handset. The transmitter comprises a cap and a cup removably coupled to the cap so as to form an assembly insertable as a unit in the transmitter receptacle of the handset. A transmitter of this type is generally described in copending U.S. patent application Ser. No. 366,501 assigned to the assignee herein. The application discloses an anti-side tone transmitter comprising a cap and cup removably coupled together. The cap is provided with a central opening and a series of satellite openings surrounding the central opening. An electret microphone is disposed below the cap such that the acoustic entrance of the microphone is substantially flush with the underside of the cap at the region of the central opening. A depending annular wall serves as an acoustic baffle between the cap satellite openings and the microphone acoustic entrance. An acoustic damping element, in the form of a large foam disk, surrounds the microphone below the satellite openings. Sound passing through the satellite openings is damped by the foam disk. Sound passing through the central opening enters the microphone acoustic entrance and is converted to electrical signals by a transmitter circuit connected to the microphone.

Heretofore, a transmitter of the type described above has not been able to provide satisfactory voice frequency and noise cancelling responses at the same time in the environment of a conventional telephone handset such as the Western Electric G-type of K-type handsets. Thus, it is desirable for a telephone transmitter to provide substantially flat voice and noise frequency responses from approximately 20 hz to 5 Khz with maximal signal to noise ratio. Various designs have been attempted to optimize the voice frequency and noise responses wherein satellite openings are provided in the cap and cup. In general, these designs have been unsatisfactory in achieving the desired voice frequency response while at the same time obtaining the desired noise cancelling effect. There is, accordingly, a need for such a telephone transmitter which provides both optimal voice frequency response and noise cancelling effect.

An object of the invention is to provide a telephone transmitter of the type which is insertable as a unit in the receptacle of a conventional telephone handset and which provides optimal voice frequency response and optimal noise cancelling effect.

Another object of the invention is to provide a telephone transmitter which may be substituted easily for the conventional carbon granule telephone transmitter.

SUMMARY OF THE INVENTION

A telephone transmitter which comprises a cap and a cup removably coupled together so as to form an assembly insertable as a unit in the transmitter receptacle of a conventional telephone handset. The cap is provided with a centrally located opening for passing sound. An acoustically deformable material covers the inlet of the cap opening. An electret microphone is disposed below the cap such that the microphone acoustic entrance faces the outlet of the cap opening. A foam ring is disposed between the cap underside and the plane of the microphone acoustic entrance. An acoustic baffle surrounds the foam ring proximate the plane of the acoustic entrance. In the preferred embodiment, the microphone casing is provided with noise cancelling side openings, and the acoustically deformable material is a Mylar membrane.

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
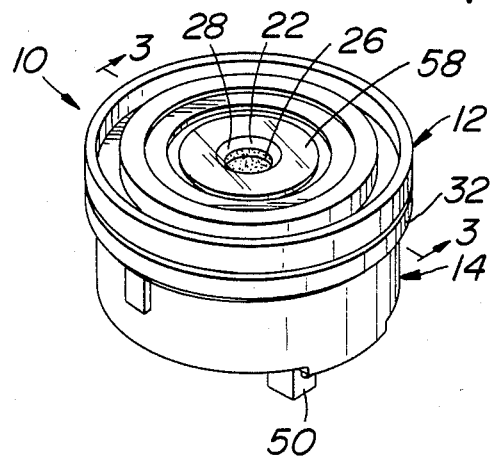
FIG. 1 is a perspective of the telephone transmitter of the present invention.
Figure 2:
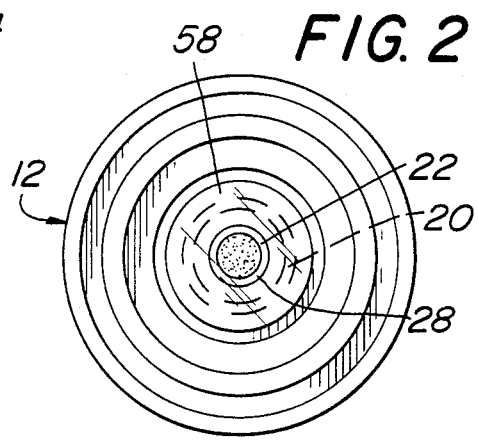
FIG. 2 is a top plan of the transmitter cap.
Figure 3:
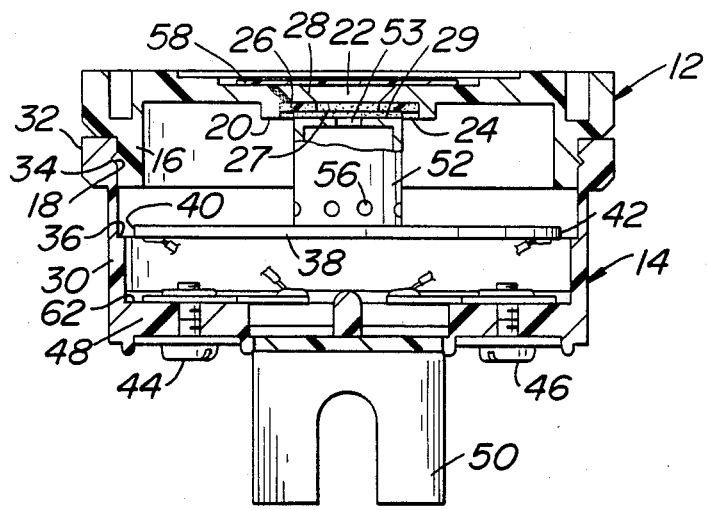
FIG. 3 is a section of the transmitter.
Figure 4:
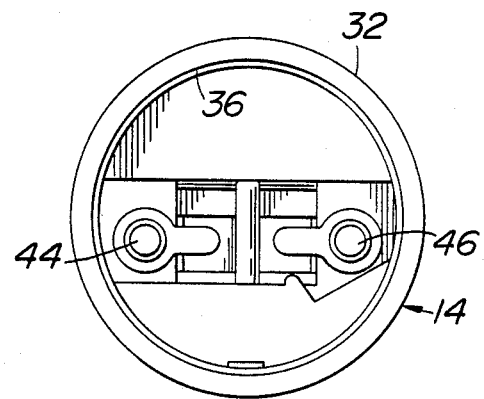
FIG. 4 is a top plan of the transmitter cup.

Referring to the drawings wherein like numerals indicate like elements, the telephone transmitter 10 of the present invention includes a cap 12 and a cup 14. The cap is provided with a depending annular peripheral wall 16 having a bead 18 formed thereon. The beach 18 mates with a groove formed in the interior face of the cup side wall as described more fully below.

The cap is also provided with a depending annular wall 20 located inwardly of wall 16 and a centrally located opening 22 which serves as a sound passage for the speaker's voice. The cap is otherwise inperforate. Wall 20 surrounds the outlet of opening 22 and serves as an acoustic baffle as described more fully below. The wall 20 and the underside of the cap proximal the outlet of central opening 22 bound a region 24 within which a foam ring 26 is located. The ring 26 may be secured in the region 24 by adhesive applied to the cap underside. In the preferred embodiment described herein, the cap opening 22 is bounded by a beveled wall 28 so that the opening gradually reduces in cross section through the thickness of the cap.

Figure 5:
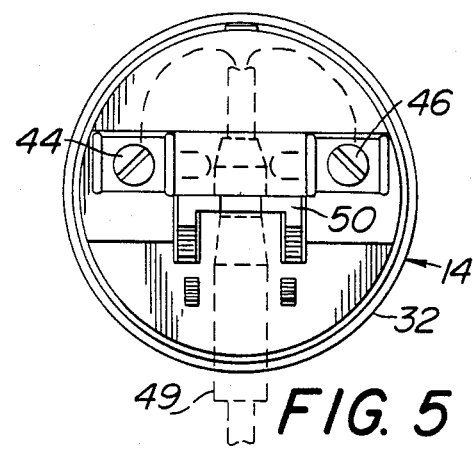
FIG. 5 is a bottom plan of the transmitter cup.
Figure 6:
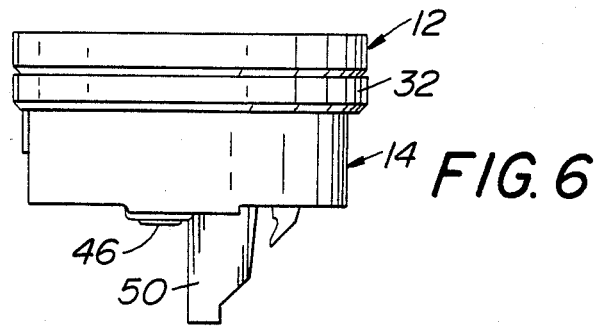
FIG. 6 is a side elevation of the transmitter.

The cup 14 includes an annular side wall 30 provided with a lip 32. The cup side wall is imperforate. The interior face of the side wall 30, at the region of the lip 32, is provided with an annular groove 34 sized so as to receive the cap bead 18 and thereby frictionally or removably couple the cap 12 and cup 14. An annular shoulder 36 is formed along the interior face of the cup side wall 30 to support a printed circuit board of generally circular shape. The peripheral edge of the printed circuit board may be cut away at diametrically opposed arc segments to form a pair of diametrically opposed flats 40, 42. The interior regions of the transmitter above and below the printed circuit board are therefore in sound communication via the spaces between the flats and the interior face of the cup side wall. A transmitter circuit (not numbered) is mounted in conventonal fashion on the printed circuit board. The circuit is electrically coupled by a pair of flexible wires (not numbered) to external screw contacts 44, 46. The cup has an imperforate bottom 48 integrally connected to side wall 30. The screw contacts are threaded in the cup bottom 48, and the caps of the screw contacts are exposed. The transmitter wires of a conventional handset cord (shown in phantom in FIG. 5) are connected to the screw contacts. The cord is provided with a sleeve 49 which seats in conventional fashion in a strain relief 50 projecting downwardly from the cup bottom 48.

An electret condensor microphone 52 is mounted on the printed circuit board 38. Preferably, the shoulder 36 is located along the interior face of the cup side wall such that the top plane of the microphone protrudes into region 24, compressing the foam ring 26 against the cap underside. The microphone 52 is provided with an acoustic entrance or opening 53 for transmitting sound produced by the speaker's voice to a diaphragm (not shown) inside the microphone casing. The acoustic entrance of the microphone is covered by a thin imperforate foam disk or screen 29. The foam disk is secured by adhesive or the like to the top of the microphone casing. Preferably, the microphone casing is provided with a series of noise cancelling side openings 56 at the lower periphery.

The inlet of the cap central opening 22 is covered by an acoustically deformable material 58 such as a Mylar membrane or sheet secured by adhesive to the cap top side. The material 58 is thought to behave as a sound diaphragm. The foam ring 26 is provided with a central opening 27 somewhat larger in diameter than the diameter of the microphone acoustic entrance but approximately equal to the diameter of the outlet of cap opening 22. The foam ring behaves as a sound absorbing or acoustic damping element. The material 58 and foam ring 26, together with the cap wall 28, bound a sound channel which communicates with the microphone acoustic entrance. The sound channel is believed to be instrumental in providing the desired voice frequency and noise cancelling effect. The acoustic baffle 20 and foam ring 26 prevent sound from entering or leaving the channel along the peripheral edge or skirt of the top plane of the microphone casing.

Figure 8:
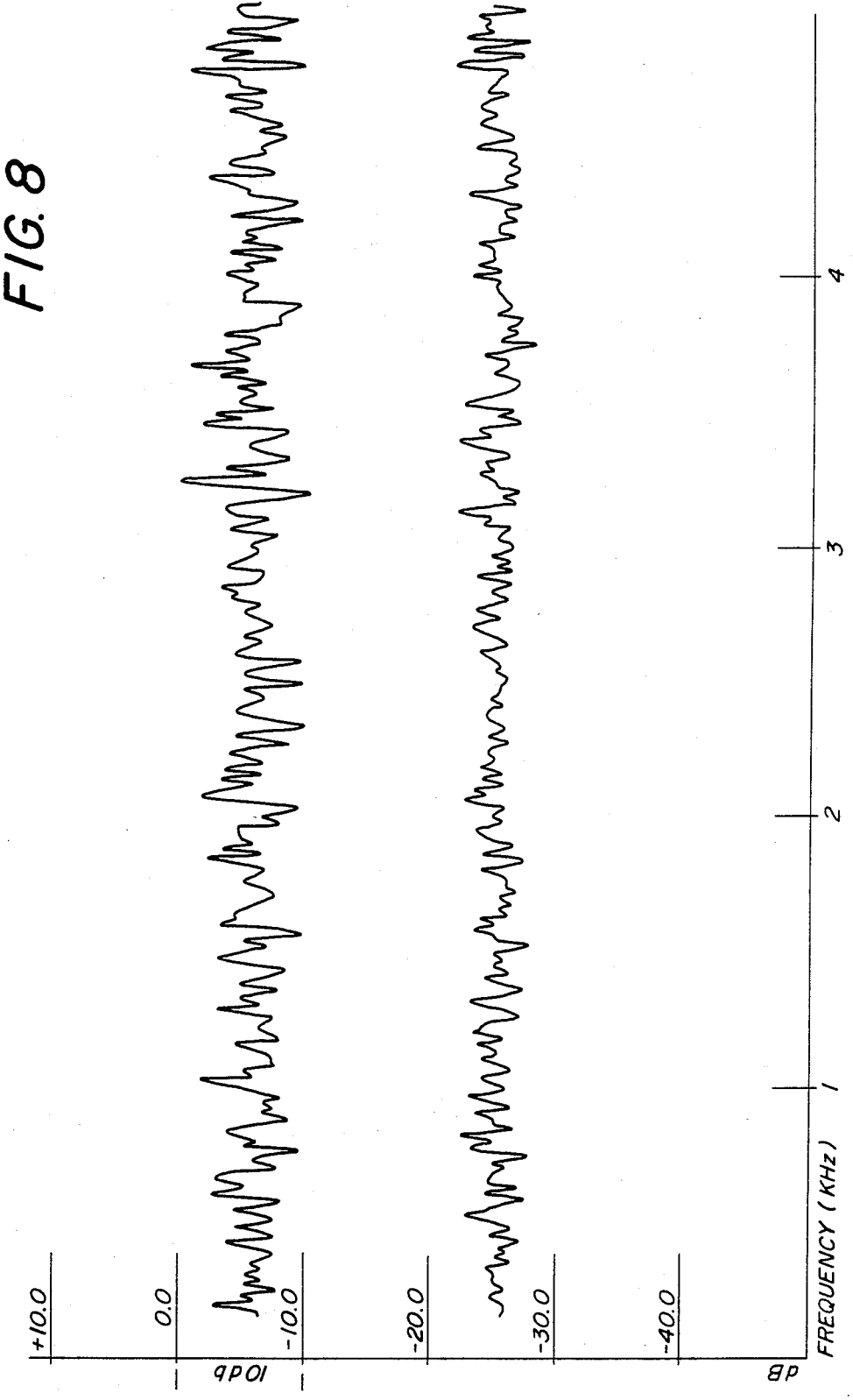
FIG. 8 is an exemplary plot of noise and voice amplitudes transmitted by the invention over the frequency range of 20 hz to 5 Khz.

The telephone transmitter 10 provides optimal voice frequency and noise cancelling response across the full frequency range of 20 hz to 5 Khz. To applicant's knowledge, no transmitter heretofore has provided optimal frequency response and, at the same time, optimal noise cancelling effect. The voice frequency and response curves obtained by the invention are exemplified in FIG. 8. Both curves are substantially flat across the entire frequency range, with signal to noise ratio approximating 20 db.

Figure 7:
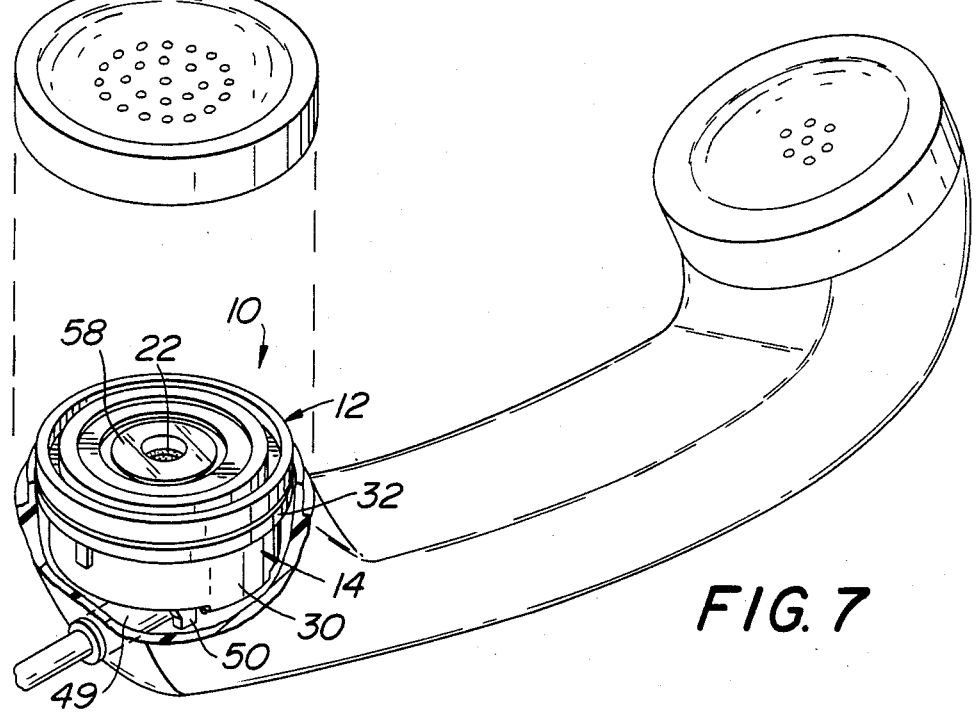
FIG. 7 shows the transmitter inserted in the telephone handset.

A transmitter has been manufactured in accordance with the preferred embodiment of the invention described herein. The beveled wall 28 of the transmitter is canted inwardly at an angle of appoximately 30° to the vertical, and the outlet of the central cap opening 22 has a reduced diameter of approximately 240 mils. The material 58 is a Mylar sheet approximately 2-3 mils thick. The depending annular wall 20 has an outer diameter of approximately 595 mils and an inner diameter of approximately 475 mils. The depending wall 20 extends downwardly approximately 75 mils from the cap underside. The cup 14 is approximately 527 mils deep from the top plane of the lip 32 to the interior surface 62 of the cup bottom. The shoulder 36 is spaced approximately 340 mils down from the top plane of lip 32. The electret condensor microphone 52 is a commercially available item such as the electret microphone manufactured by Primo company. The peripheral cap wall 16 has an outer diameter of approximately 1544 mils. The cap and cup are made of a plastic polymeric material. The cup sidewall and bottom are imperforate. In use, the transmitter is inserted in the handset transmitter receptacle as shown in FIG. 7. The receptacle is then covered by the handset cap. The transmitter produced the voice frequency and noise response curves shown in FIG. 8.

The present invention may be embodied in other specific forms without departing from the spirit or essential attributes thereof and, accordingly, reference should be made to the appended claims, rather than to the foregoing specification, as indicating the scope of the invention.

I claim:

1. A telephone transmitter insertable in the transmitter receptacle of a telephone handset, comprising:
    a cap provided with an opening for passing sound, and an acoustically deformable material secured to the top side of the cap so as to cover the inlet of said opening,
    a cup coupled to said cap whereby said cap and cup form an assembly insertable as a unit in the transmitter receptacle of the telephone handset,
    a microphone disposed within said unit and having a casing provided with an acoustic entrance facing the underside of said cap adjacent the outlet of said cap opening,
    an acoustic damping element disposed outside said microphone casing between said microphone casing and the underside of said cap adjacent the outlet of said cap opening, said acoustic damping element being provided with an opening disposed between the outlet of said cap opening and said microphone acoustic entrance whereby said cap opening and said acoustic damping element opening form a sound channel between said acoustically deformable material and said microphone acoustic entrance.

2. The telephone transmitter according to claim 1 wherein said acoustically deformable material is a Mylar sheet.

3. The telephone transmitter according to claim 1 wherein said cap includes an acoustic baffle surrounding said acoustic damping element outside said microphone casing.

4. The telephone transmitter according to claim 3 wherein said acoustic baffle surrounds a region proximate the plane of said acoustic entrance.

5. The telephone transmitter according to claim 1 wherein said microphone casing is provided with noise cancelling side openings.

6. The telephone transmitter according to claim 3 wherein said acoustic baffle comprises an annular wall depending from the underside of the cap.

7. The telephone transmitter according to claim 2 wherein said Mylar sheet is approximately 2-3 mils thick.

8. The telephone transmitter according to claim 1 wherein said cap and cup are made of a plastic polymeric material.

9. The telephone transmitter according to claim 1 wherein said cap and cup are provided with structure for removably coupling the cap and cup together.

10. The telephone transmitter according to claim 1 wherein said cup is imperforate.

11. The telephone transmitter according to claim 1 wherein said acoustic damping element is a foam ring.

12. The telephone transmitter according to claim 1 wherein said cap opening is bounded by a beveled wall canted at approximately 30° to the vertical and wherein the outlet of said cap opening has a diameter of approximately 240 mils.

13. The telephone transmitter according to claim 6 wherein said annular wall projects downwardly approximately 75 mils from the underside of the cap.

14. The telephone transmitter according to claim 13 wherein said annular depending wall is approximately 120 mils thick.

* * * * *